(12) United States Patent
Kummer et al.

(10) Patent No.: US 7,832,535 B2
(45) Date of Patent: Nov. 16, 2010

(54) METHOD OF CONTROLLING AN EXTERNAL ACTIVATION CLUTCH BRAKE

(75) Inventors: Martin E. Kummer, Auburn, IN (US); Kevin F. Schlosser, Auburn, IN (US); Daniel V. Gochenour, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 12/620,870

(22) Filed: Nov. 18, 2009

(65) Prior Publication Data

US 2010/0062901 A1  Mar. 11, 2010

Related U.S. Application Data

(62) Division of application No. 11/315,087, filed on Dec. 21, 2005, now Pat. No. 7,641,032.

(51) Int. Cl.
*F16D 67/04* (2006.01)

(52) U.S. Cl. .................................. 192/13 R; 192/30 W

(58) Field of Classification Search ....................... None
See application file for complete search history.

(56) References Cited

U.S. PATENT DOCUMENTS

| 4,290,507 | A | 9/1981 | Brown |
| 4,393,751 | A | 7/1983 | Kelley |
| 4,516,063 | A | 5/1985 | Kaye et al. |
| 5,452,779 | A | 9/1995 | Gee |
| 6,591,710 | B1 | 7/2003 | Shaw |
| 6,679,458 | B2 | 1/2004 | Einthoven et al. |
| 6,684,987 | B2 | 2/2004 | Stachowski et al. |
| 2003/0057693 | A1 | 3/2003 | Neag et al. |
| 2004/0016618 | A1 | 1/2004 | Bender et al. |
| 2005/0217966 | A1 | 10/2005 | Hornbrook et al. |

*Primary Examiner*—Sherry L Estremsky
*Assistant Examiner*—Edwin A. Young
(74) *Attorney, Agent, or Firm*—Brooks Kushman P.C.

(57) ABSTRACT

A method of controlling an activation load applied to a clutch pedal. A first load is applied to the clutch pedal that has a first reaction force in a first phase of pedal movement. A switch is activated at the end of the first phase. When the switch is activated, a second load that is greater than the first load is applied to the pedal that provides a second reaction force in a second phase of pedal movement.

7 Claims, 6 Drawing Sheets

METHOD OF CONTROLLING AN EXTERNAL ACTIVATION CLUTCH BRAKE

CROSS-REFERENCE TO RELATED APPLICATIONS

This application is a division of U.S. application Ser. No. 11/315,087 filed Dec. 21, 2005.

BACKGROUND OF THE INVENTION

1. Field of the Invention

The present invention relates to an externally activated input shaft clutch brake having a clutch pedal that simulates the feel of the engagement of a clutch brake that has a mechanical linkage.

2. Background Art

Clutches for multi-speed transmissions generally include a release bearing that disengages the clutch to permit the transmission to be shifted between gears. Some hydraulic clutch release systems may be synchronized by synchronizing systems that match shaft speeds. Non-synchronized transmissions do not require synchronizers, but may benefit from an input shaft brake, especially for first gear and reverse gear engagement.

Non-synchronized transmissions may be provided with a wear compensating hydraulic release system and cannot use economical prior art clutch designs. Pneumatic, hydraulic, electric or internal transmission brake-control systems have been proposed that use an external activation system to energize an input shaft clutch brake.

External activation clutch brakes (EACB) can be triggered by many different methods. The simplest method of triggering an EACB is an electrical switch. Other methods of triggering an EACB may include pneumatic or hydraulic valves and the like. An intelligent brake control system may include input systems from the following sources: clutch pedal release; transmission in neutral; vehicle road speed; engine rpm; transmission input shaft rpm; engagement time; or clutch brake torque.

Any or all of the above inputs can be used in the control of a clutch brake. The advantages of an intelligent brake control system include the control of the length of engagement time, engagement only when the vehicle is not moving, engagement only when the transmission is in neutral, engagement only when the clutch pedal is suppressed, or engagement only when two or more of the above conditions are present. Prior art clutch brake engagement timing may be affected by a self-adjusting clutch mechanism.

FIG. 1 illustrates a conventional "pull-type" clutch 10 for a non-synchronized transmission system. A clutch pedal 12 is shown in conjunction with a portion of a truck cab floor 14 toward which the clutch pedal 12 is moved to disengage the clutch. A clutch release linkage 18 is diagrammatically shown to include a plurality of links and mechanical pivots. The clutch release linkage 18 transfer movements of the clutch pedal 12 to a clutch release bearing 20. The clutch release bearing 20 is disposed between an engine 22 that provides torque and an input shaft clutch brake 24. The input shaft clutch brake 24 engages a bearing cap 26 of a transmission 28 to apply a braking force to the input shaft. The input shaft clutch brake 24 is adapted to stop rotation of the input shaft of the transmission 28 particularly when it is desired to shift the transmission between low range gears or between forward and reverse.

In conventional "pull-type" clutches for non-synchronized transmission systems, the clutch brake 24 may be keyed to an input shaft between the release bearing 20 and the bearing cap 26. When the clutch 10 is disengaged, the release bearing 20 disengages the driven disk and clamps the clutch brake 24 against the transmission bearing cap 26 causing the input shaft to slow until it stops rotating allowing the gears in the non-synchronized transmission to be changed without causing gear clash/damage and facilitating shifting into a new gear range.

The clamping action of the release bearing 20, clutch brake 24 and transmission bearing cap 26 causes an increase in the load required to depress the pedal 12 near the bottom of the pedal stroke. A driver feels this increase in load and realizes that the clutch brake 24 has been engaged. This increased load phenomenon is known as "clutch brake squeeze." Drivers are familiar with the feel of a pedal 12 as it provides clutch brake squeeze and react to clutch brake squeeze by shifting the transmission only after such feedback is felt.

Conventional pull-type clutches generally include a mechanical linkage that transmits the pedal motion to the clutch release bearing linkage and in turn to the clutch release bearing and input shaft brake mechanism. Pneumatic, hydraulic, electric or internal transmission brake-control systems have been developed that may benefit from the use of an external activation system to energize clutch brakes. An external activation clutch brake may be actuated by a simple switch that is independent of the clutch release bearing position. The switch can be located at various positions in the clutch release linkage or on the transmission. The output of such a switch may be combined with other vehicle switch outputs for controlling the input shaft brake.

There is a need for an external activation clutch brake that simulates the clutch brake squeeze feel of the release bearing load and increases the pedal force at the bottom of the pedal stroke. There is also a need for a clutch brake system that can be triggered by a simple switch or valve that can be used to control actuation of the clutch brake while simulating the feed of a conventional clutch brake.

These and other problems and needs are addressed by applicants' invention as summarized below.

SUMMARY OF THE INVENTION

According to one aspect of the present invention, a method of controlling an activation load applied to a clutch pedal having a control link and an external activation clutch brake is provided. A switch actuates the external activation clutch brake. The method comprises applying a first load to the clutch pedal that has a first reaction force in a first phase of clutch pedal movement. The switch is actuated at the end of the first phase at which time a second, and greater, load is required to be applied to the clutch pedal that has a second reaction force in a second phase of clutch pedal movement. The second reaction force is greater than the first reaction force.

According to other aspects of the method of the present invention, the control link to the external activation clutch brake may be a hydraulic circuit that has a plurality of movable mechanical elements. Mechanical elements may include the clutch pedal, a master cylinder, a slave cylinder, a release bearing link, or a release bearing. One of the mechanical elements of the control link is moved to actuate the switch. The switch may be an electrical switch or could be a pneumatic or hydraulic valve.

According to other aspects of the method of the present invention, a second reaction force may be provided by a helical spring that engages one of the mechanical elements during the second phase of clutch pedal movement. Alternatively, the second reaction force may be provided by a valve in the hydraulic circuit that closes to increase the reaction force from the level of the first reaction force to the level of the second reaction force.

The switch may be associated with a transmission control element that is moved when the transmission is shifted between gears. The switch may also be a pressure switch in the pressure input side of the slave cylinder that is actuated when pressure increases in the hydraulic circuit as the clutch reaches its maximum travel position.

These and other aspects of the present invention will be better understood in view of the attached drawings and the following detailed description of the illustrated embodiment of the invention.

DETAILED DESCRIPTION OF THE PREFERRED EMBODIMENT(S)

Figure 2A:
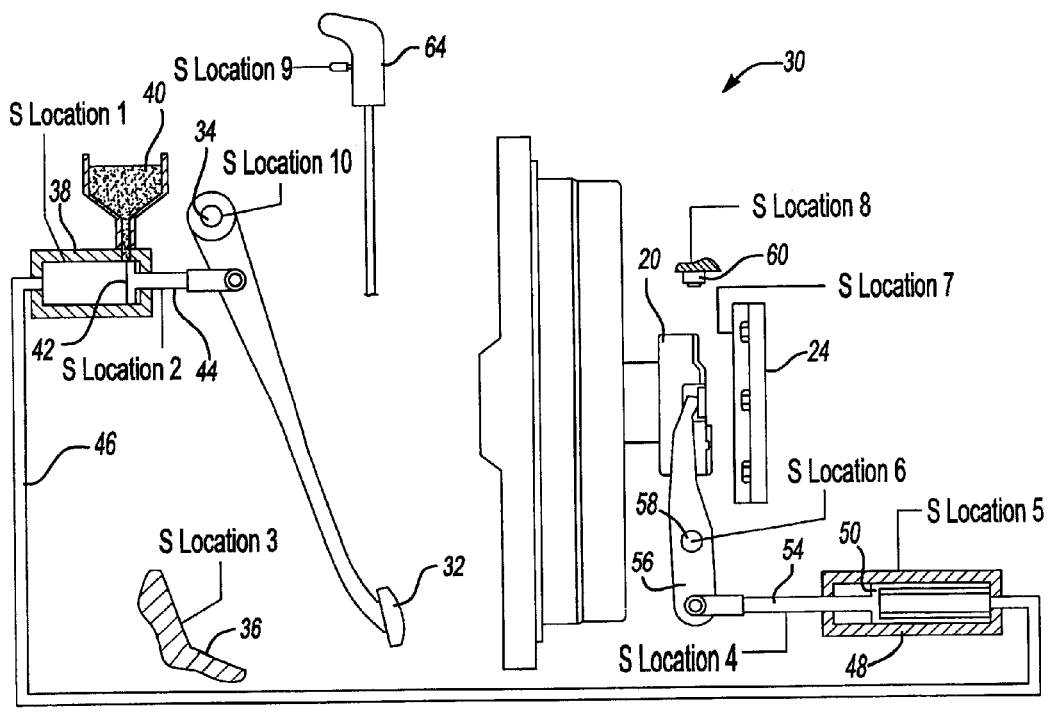
FIG. 2A is a drawing of potential switch locations for a clutch release linkage.

Referring to FIG. 2A, a clutch release system is generally indicated by reference numeral 30. The clutch release system 30 includes a clutch pedal 32 that is pivoted about a pedal arm pivot 34 toward and away from a cab floor 36. A master cylinder 38 is provided with hydraulic fluid from a hydraulic fluid supply 40. The master cylinder 38 includes a piston 42 and a rod 44. The clutch pedal 32 is connected to one end of the rod 44. When the clutch pedal 32 is depressed the rod 44 is shifted causing the piston 42 to move. Hydraulic fluid communicates through a hydraulic line 46 to a slave cylinder 48. Slave cylinder 48 includes a piston 50 and a rod 54. Rod 54 is connected to a release arm 56 that is pivotable about a release arm pivot 58. Release arm 56 engages the conventional clutch release bearing 20 to engage and disengage the clutch.

Figure 2B:
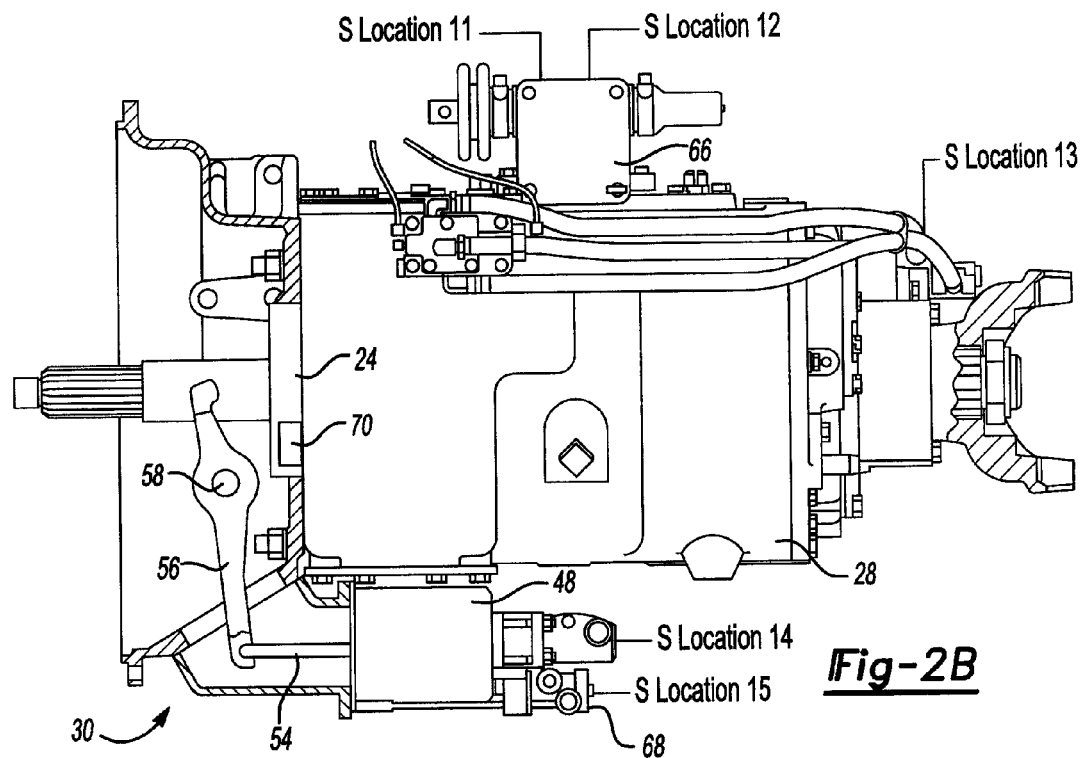
FIG. 2B is a schematic drawing of potential switch locations for a transmission and shifter.

Referring to FIG. 2B, the clutch release system 30 is partially shown to illustrate the portion of the clutch release system that is associated with the transmission 28. The input shaft clutch brake 24 is operated by the release arm 56 that pivots about the release arm pivot 58. Rod 54 of the slave cylinder 48 is moved in a reciprocal fashion to pivot the release arm 56. An input side 68 of the slave cylinder 48 is connected to the hydraulic line 46. The conventional transmission 28 may be provided with a shifter tower 66 that is connected by a conventional linkage to a gear shift lever 64.

A thermal switch 70 is diagrammatically shown as part of input shaft clutch brake 24. Thermal switch 70 can be installed or encased in the input shaft clutch brake or externally actuated clutch brake. The thermal switch 70 can be combined in series with the actuation switch so that as excessive temperatures are encountered as a result of abuse or malfunction, the external activation clutch brake can be deactivated.

A central switch may be provided in variety of location that will be described with reference to FIGS. 2A and 2B. A first switch location denoted S location 1 in FIG. 2A indicates the potential position of a switch that is internal to the master cylinder and activated by the piston stroke. When the piston 42 is near the bottom of the stroke and the clutch is fully released, a switch may be actuated to send a signal to the external activation clutch brake 24.

Switch location 2 is denoted S location 2 in FIG. 2 and represents a switch that is externally mounted relative to the master cylinder and is activated in response to depression of the clutch pedal 32 and movement of the rod 44. This switch could be the same switch that is commonly referred to as the clutch pedal depressed switch. The clutch pedal depressed switch is used on some vehicles as an input for engine starting.

Switch location 3 denoted S location 3 represents a switch mounted either on the pedal arm 32, floor board 36 or firewall of the vehicle that is activated at the bottom of the clutch pedal stroke. A switch at S location 3 may also function as a clutch pedal depressed or clutch disengaged signal that may be used in the ignition system on some vehicles.

S location 4 refers to a switch mounted externally relative to the clutch slave cylinder 48 that is activated by a reciprocal movement of the rod 54 of the slave cylinder 48. The rod 54 is moved when the piston 50 is shifted by hydraulic fluid in the hydraulic line 46. A sensor at S location 4 senses movement of the rod 54 as it moves the release arm 56 in a pivoting fashion about release arm pivot 58. Release arm 56 moves the clutch release bearing 20 toward and away from the input shaft clutch brake 24.

Switch location 5 is denoted S location 5 and represents an internal switch in the slave cylinder 48 that is actuated by movement of the piston 50 within the slave cylinder 48. A rotary switch may be mounted at S location 6 on the release arm pivot 58 that is activated by rotational travel of the cross shaft release arm. Switch locations S location 7 and S location 8 may be mechanical limit switches that are mounted in or near the clutch brake 24 and are actuated as the release bearing travels and comes into contact with the mechanical limit switch arm. Alternatively, a displacement transducer of a contacting or non-contacting type may be used as a switch that is actuated by release bearing travel or in other switch locations.

Switch location 9, denoted S location 9 represents a switch disposed in the gear shift lever, gear shift arm, steering wheel or dashboard that may be activated manually by the driver when the driver decides that it is needed to engage the input shaft clutch brake 24. Switch location 10 is denoted S location 10 and refers to a rotary type switch that may be mounted on the clutch pedal pivot 34 is activated by pivoting the clutch pedal 32.

Referring to FIG. 2B, additional switch locations are illustrated wherein a location denoted S location 11 represents a switch mounted in the transmission shifter tower 66 that is activated by selection of first gear or a reverse gear. This switch could be coupled to other transmission gear functions such as a computer controlled transmission shifter or the neutral start switch. This switch function may be provided as an expanded function for the first gear and/or reverse gear detection sensors.

Switch locations 12 and 13 are denoted S location 12 and S location 13, respectively. A switch provided in locations 12 and 13 may correspond to a forward-neutral-reverse detection switch in a transmission. These switches may have additional functions including inclusion in the vehicle starting circuit and reverse backup or warning activation circuits.

Switches in locations 14 and 15 are denoted as S location 14 and S location 15, respectively. Switches in these locations may be pressure switches provided in the input side of the slave cylinder 24 that are actuated by an increase in pressure that occurs when the clutch pedal reaches its maximum level and bottoms out.

Any of the above switches can be joined in series or parallel path to enable or disable activation of the external activation clutch brake. For example, a switch in location 3 can be connected with a switch in location 11 to assure that the clutch pedal 32 is fully depressed (clutch released) and that the transmission 28 is in neutral before the external actuation clutch brake 24 engages and stops rotation of the transmission input shaft. The use of two switches in series may function as a failsafe circuit that would prevent the external activation clutch brake to be activated when the transmission 28 or the clutch is not released. Another example of a combination switches that may be connected in series would include, for example, switch locations 9 and 11 which if connected in series would only permit the driver to activate the external activation clutch brake when the transmission is in neutral.

A switch in switch locations 2 and 3 may be joined in parallel so that the actuation of a switch in either location could be used to actuate the external actuation clutch brake.

Thermal cutout switch 70 could be installed or encased in the external activation clutch brake 24 and joined in series with one or more of the activation switches. If so, excessive temperatures in the external activation clutch brake that may be caused by abuse or malfunction could result in deactivation of the external activation clutch brake.

Figure 1:
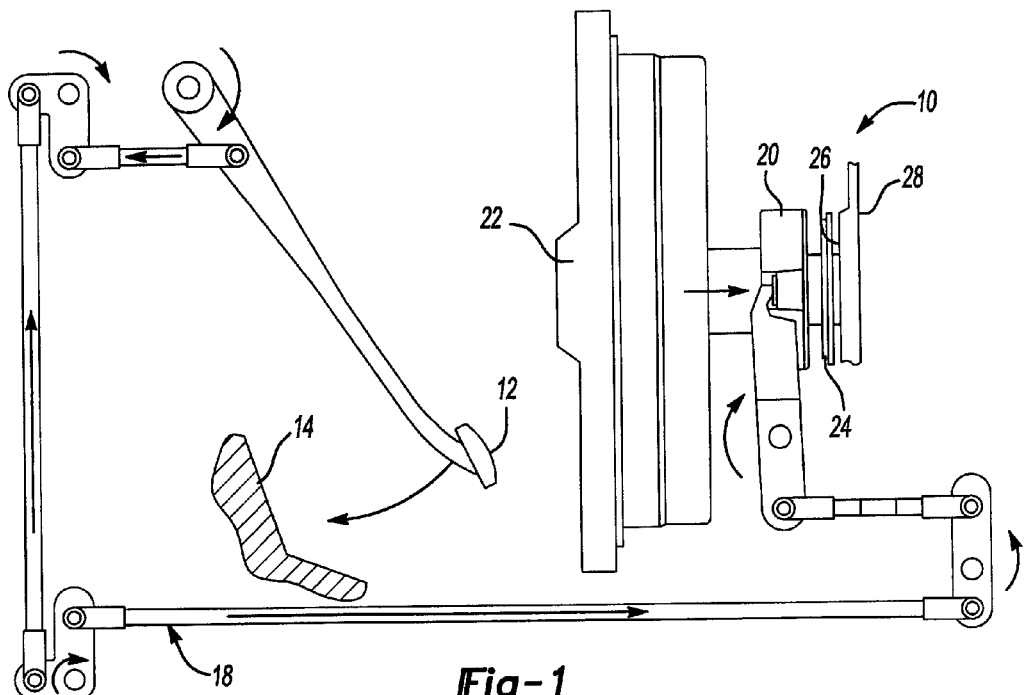
FIG. 1 is a schematic drawing of a pull-type clutch release linkage and clutch brake made according to the prior art.

An intelligent brake control system having switches in any of the above locations would normally lack a mechanism for providing feedback to a driver to engage a new gear set without grinding the gears. Intelligent brake control systems do not provide clutch brake squeeze feedback that is inherent in systems such as that shown in FIG. 1 and described in the background art section of this application.

Figure 3A:
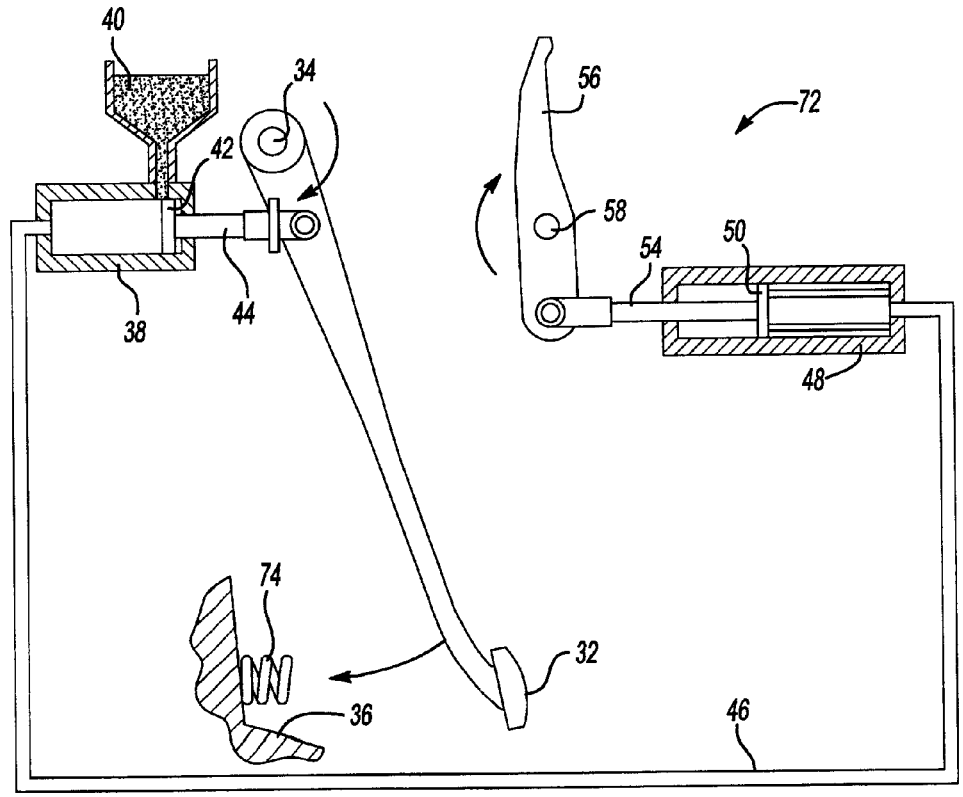
FIGS. 3A-3D are schematic representations of a clutch pedal activation load simulator using a compression spring in one of four potential locations.
Figure 3B:
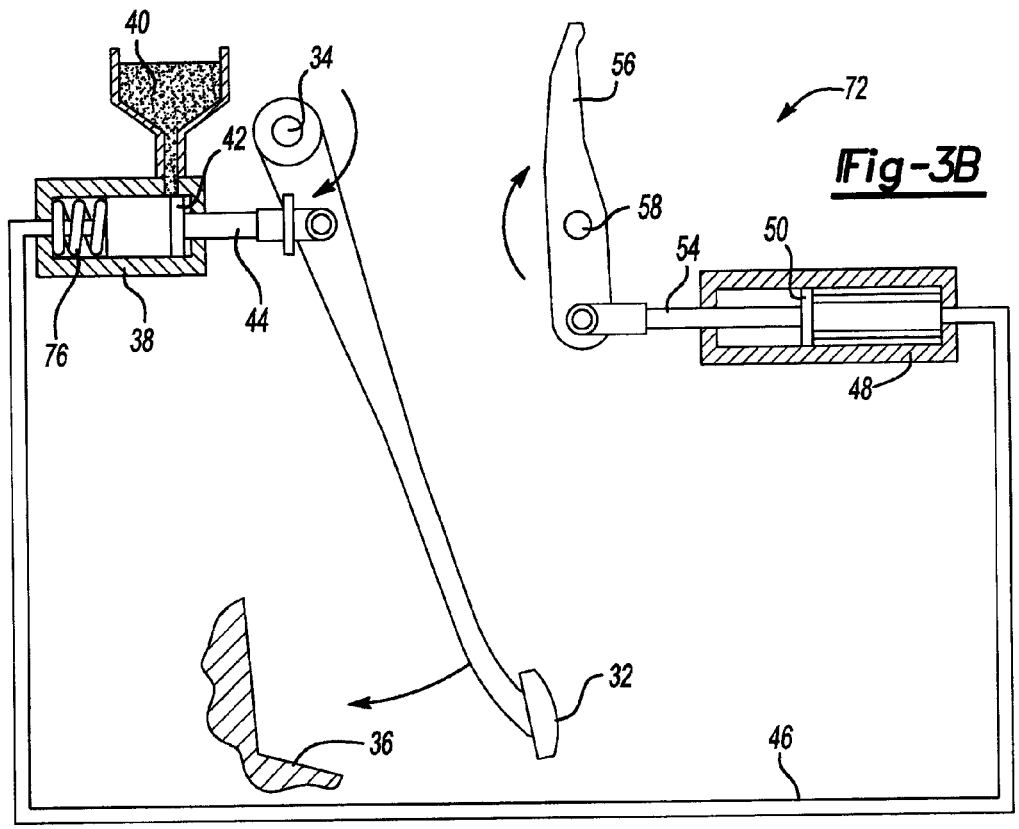
Figure 3C:
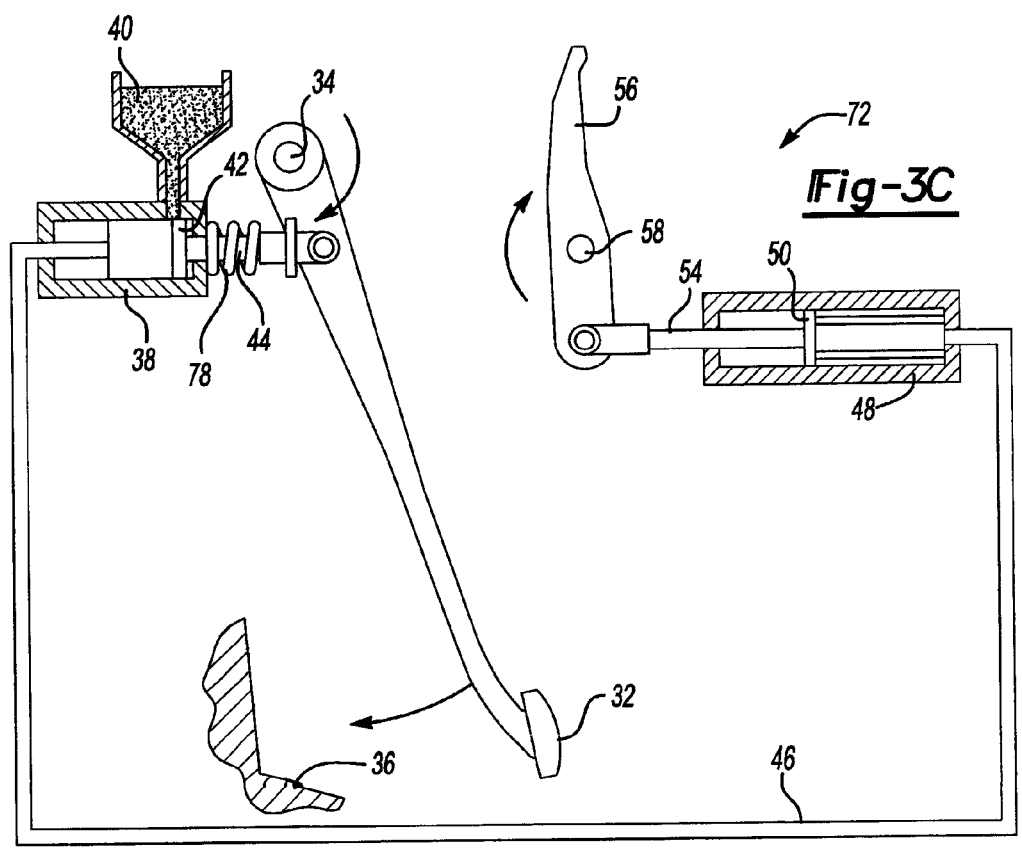
Figure 3D:
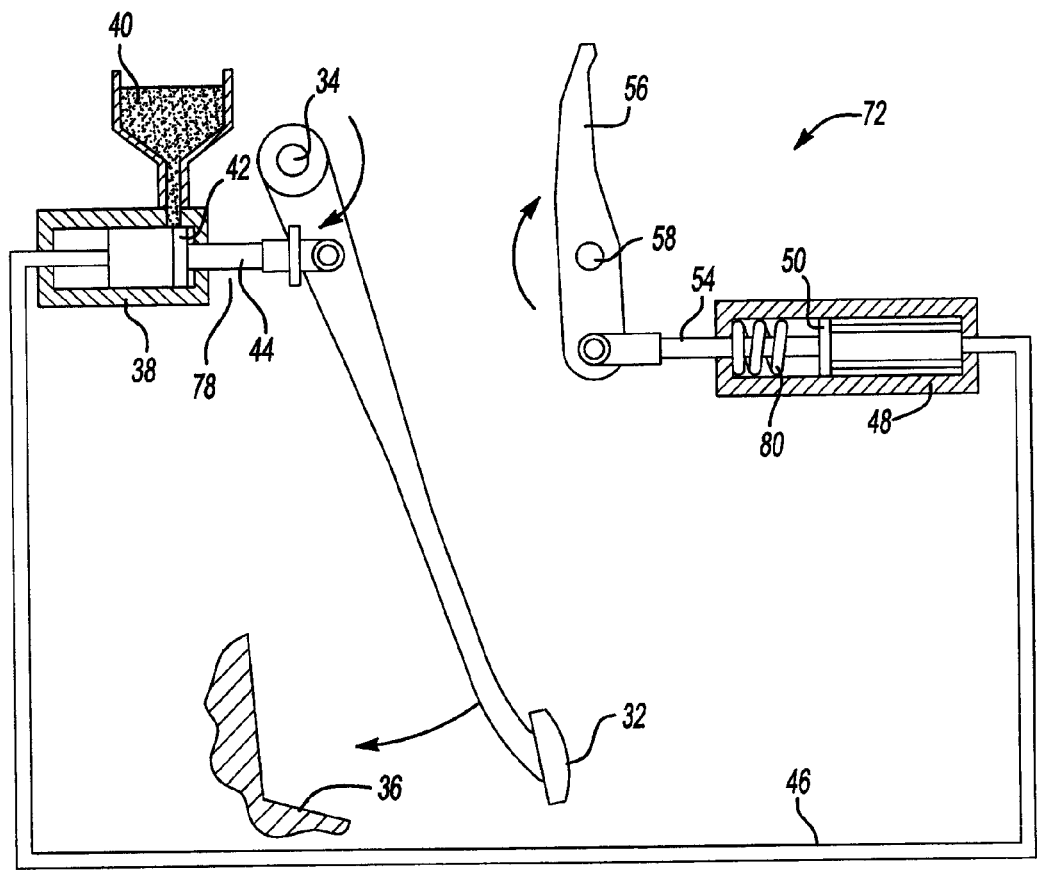
Figure 4:
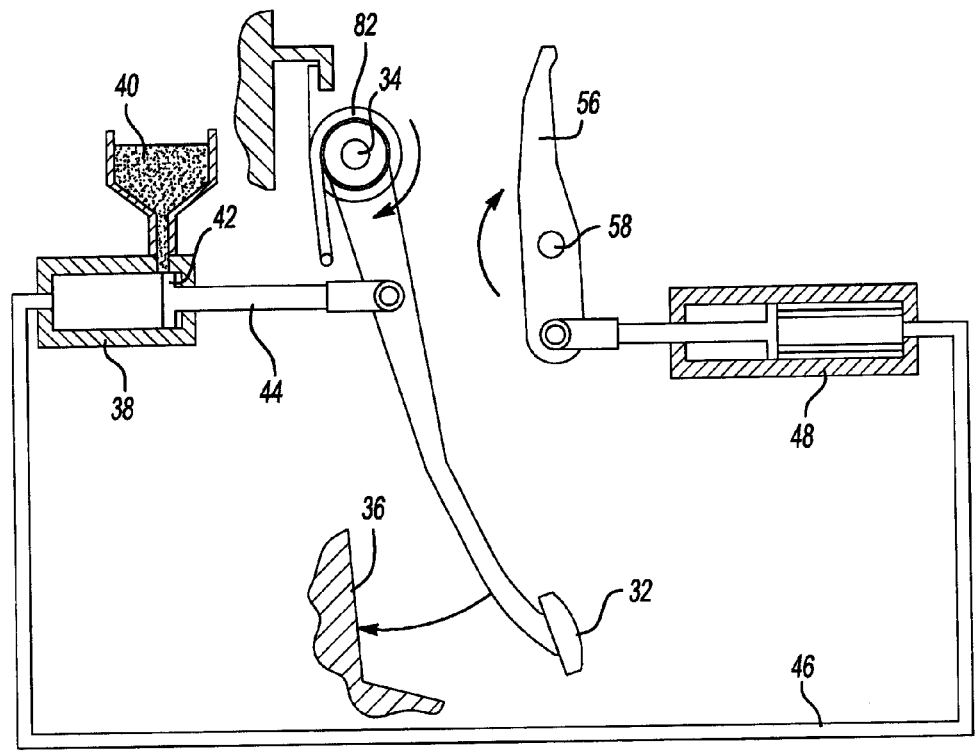
FIG. 4 is a schematic representation of a clutch pedal activation load simulation system using a torsion spring on the clutch pedal pivot.
Figure 5:
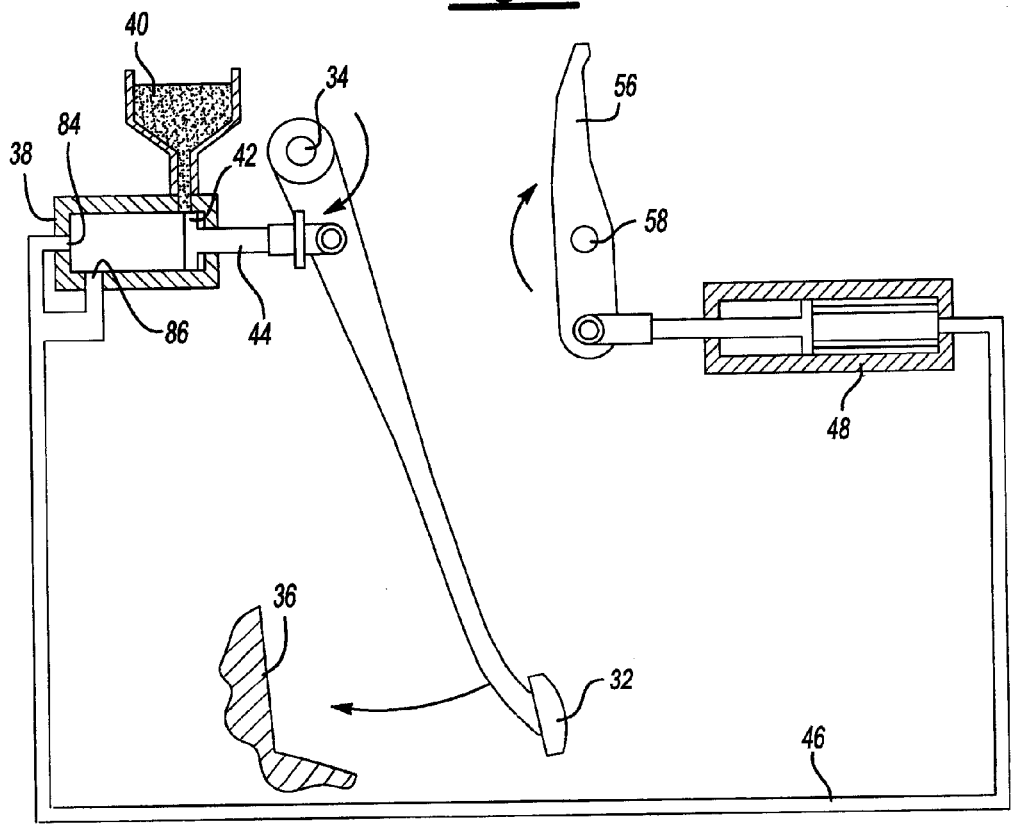
FIG. 5 is a schematic representation of a clutch pedal brake activation load simulation system using a master cylinder that has an output flow restriction mechanism that restricts output flow at the end of the pedal travel.

Referring to FIGS. 3 through 5, three different embodiments of systems for simulating clutch brake squeeze are illustrated. With a clutch brake squeeze simulation the driver can be provided with an equivalent feel when the external actuation clutch brake is activated just like a prior art system shown in FIG. 1.

Referring to FIGS. 3A-D, four different compression spring locations are shown, any one of which may be used to simulate clutch brake squeeze. While the compression springs in this embodiment are illustrated as helical springs, other types of springs such as belleville washers, leaf springs, compression springs, or wave washers can also be used in a similar manner. According to the embodiment shown in FIG. 3A, a compression spring 74 may be provided on the cab floor 36. The compression spring 74 is engaged by the clutch pedal 32 at the end of the clutch pedal stroke to provide simulated clutch brake squeeze feedback. The feedback mechanism is the increased load that is required to move the clutch pedal 32. The clutch pedal 32 has a first phase of movement wherein only a base level of load is required to move the pedal 32. When the pedal engages the spring 74 a second phase begins and increased load is required to further depress the clutch pedal 32. This simulates the clutch brake squeeze of a conventional clutch as described with reference to FIG. 1 above.

Another alternative embodiment is shown in FIG. 3B wherein a spring 76 is provided within the master cylinder 38. The spring 76 is engaged by the piston 42 when the pedal 32 drives the rod 44 causing the piston 42 to move into engagement with the spring 76.

In another alternative, shown in FIG. 3C, a spring 78 may be provided on the rod 44 of the master cylinder 38. The pedal 32 is depressed until the pedal or a member that is fixed relative to the pedal 32 engages the spring 44.

In yet another alternative embodiment illustrated in FIG. 3D, a spring 80 may be provided in the slave cylinder 48. Slave cylinder 48 is moved by hydraulic fluid passing through hydraulic line 46 that shifts the piston 50 of the slave cylinder. When the piston 50 is shifted it initially moves with a first load being applied thereto until it contacts the spring 80. After the piston 50 contacts the spring 80 further movement of the piston 50 requires an additional incremental load in a second phase of movement. The second phase of movement corresponds to movement required to engage the input shaft clutch brake 24. Only one of the springs need to be provided to obtain the simulation. However, it is possible that more than one of the springs may be included, if desired.

Referring to FIG. 4, another alternative embodiment is shown wherein a torsion spring 82 is secured to the clutch pedal 32 at the pedal arm pivot 34. The torsion spring is secured to the pedal so that in a first phase of movement the pedal 32 requires a first load to displace the pedal. After the pedal 32 engages the torsion spring 82 a second phase of movement begins wherein a greater load is required to further move the clutch pedal 32. Movement of the clutch pedal causes rod 44 of the master cylinder 38 to move the piston 42 within the master cylinder 38. Hydraulic fluid from the reservoir 40 is transmitted through the hydraulic line 46 to a slave cylinder 48 that in turn pivots the release arm 56 about the release arm pivot 58.

Referring to FIG. 5, another alternative embodiment is shown in which first and second phases of movement of the clutch pedal are established by providing an axial port 84 and a radial port 86 that both provide hydraulic fluid to the hydraulic line 46 in a first phase of movement. When the clutch pedal 32 is moved toward the cab floor 36 the first phase of movement occurs wherein a first level of load is required to move the clutch pedal 32. The clutch pedal 32 pivots on its pivot 34 and drives the rod 44 of the master cylinder 38. The rod 44 drives the piston 42 of the master cylinder 38 until it passes the radial port 86. When the radial port 86 is covered by the piston 42 the only hydraulic fluid provided to the hydraulic line 46 is provided through the axial port 84. This causes the load required to move the pedal 32 to increase and thereby simulates the clutch brake squeeze of a pull-type clutch release system. Hydraulic fluid in the hydraulic line 46 is transmitted to the slave cylinder 48 that in turn pivots the release arm 56 about the release arm pivot 58.

Figure 6:
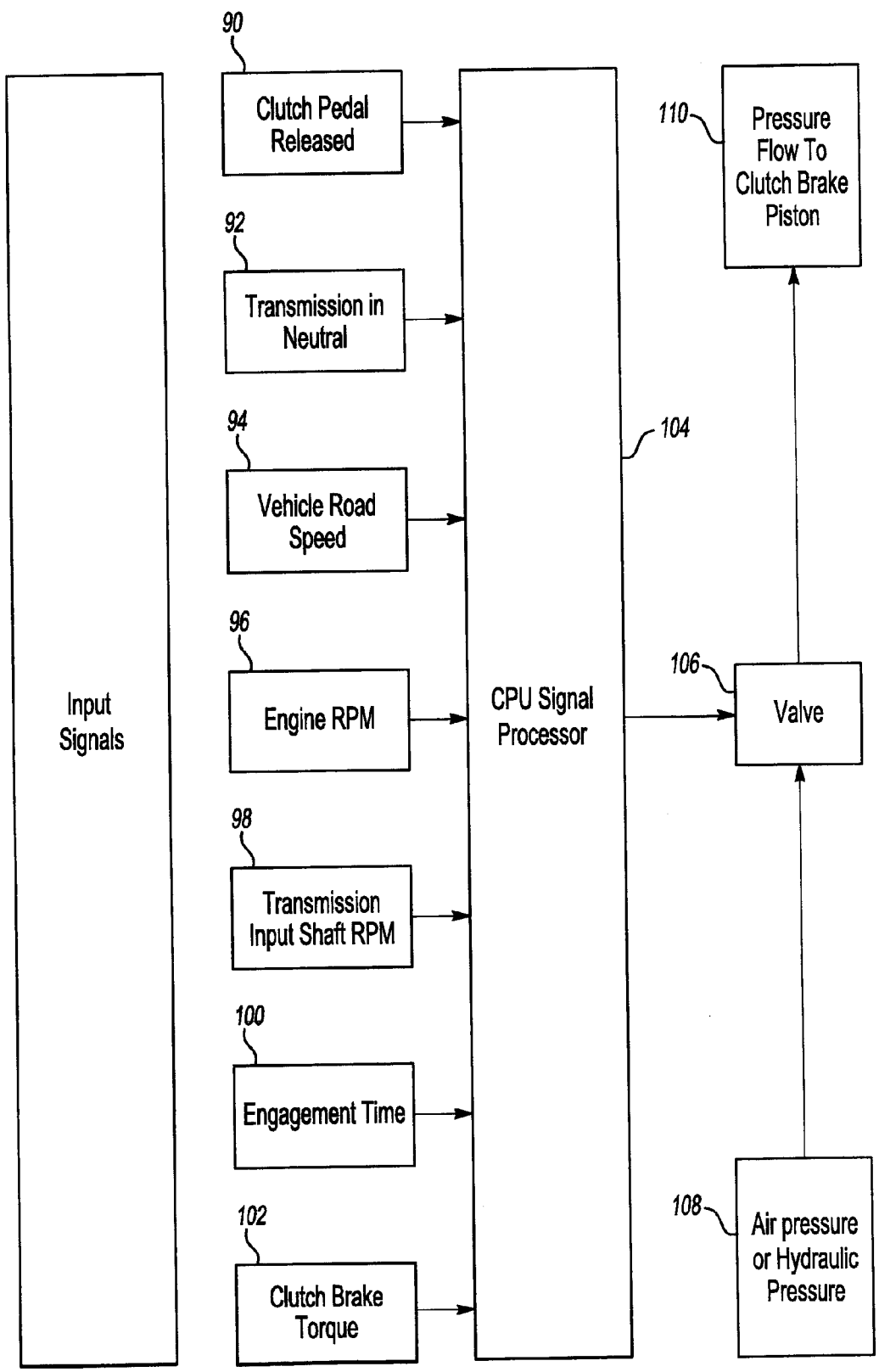
FIG. 6 is a flowchart of an intelligent brake control system.

Referring to FIG. 6, an intelligent brake control system is shown in a block diagram. The intelligent brake control system may receive input signals that are indicative of the clutch pedal being released at 90 or a signal that the transmission is in neutral at 92. Other operational parameters that may be used as input signals include an output signal from a vehicle road speed sensor at 94, or an engine RPM sensor at 96. A transmission input shaft RPM signal at 98, engagement time signal at 100 or a clutch brake torque signal at 102 may be used as input signals. One or more of these signals may be used by the CPU signal processor 104. The CPU signal processor 104 may actuate a valve 106 that permits air pressure or hydraulic pressure supplied at 108 to be provided to the valve to apply pressure flow to the clutch brake piston 110. Pressure that flows to the clutch brake piston at 110 is applied to the clutch brake piston and may be used to exert a braking force on the input shaft of the transmission as previously described.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of controlling the activation load applied to a clutch pedal having a control link to an external activation clutch brake and a switch that actuates the external activation clutch brake comprising:
    applying a first load to the clutch pedal that has a first reaction force in a first phase of clutch pedal movement;
    actuating the switch at the end of the first phase; and
    applying a second load to the clutch pedal that has a second reaction force in a second phase of clutch pedal movement that is greater than the first reaction force.

2. The method of claim 1 wherein the control link to the external activation clutch brake is a hydraulic circuit that has a plurality of mechanical elements that move including the clutch pedal, a master cylinder, a slave cylinder, a release bearing linkage, and release bearing, and wherein one of the mechanical elements of the control link is moved to actuate the switch.

3. The method of claim 2 wherein the switch is an electrical switch.

4. The method of claim 2 wherein the second reaction force is provided by a helical spring that engages one of the mechanical elements during the second phase of clutch pedal movement.

5. The method of claim 2 wherein the second reaction force is provided by a valve in the hydraulic circuit that closes to increase the reaction force from the level of the first reaction force to the level of the second reaction force.

6. The method of claim 1 wherein the switch is associated with a transmission control element that is moved when the transmission is shifted between gears.

7. The method of claim 1 wherein the switch is a pressure switch in the pressure input side of the slave cylinder that is actuated when pressure increases in the hydraulic circuit as the clutch reaches its maximum travel.

* * * * *